March 30, 1926.  1,578,816
P. EIFRIED
COMBINED POT AND LID LIFTER
Filed July 17, 1925
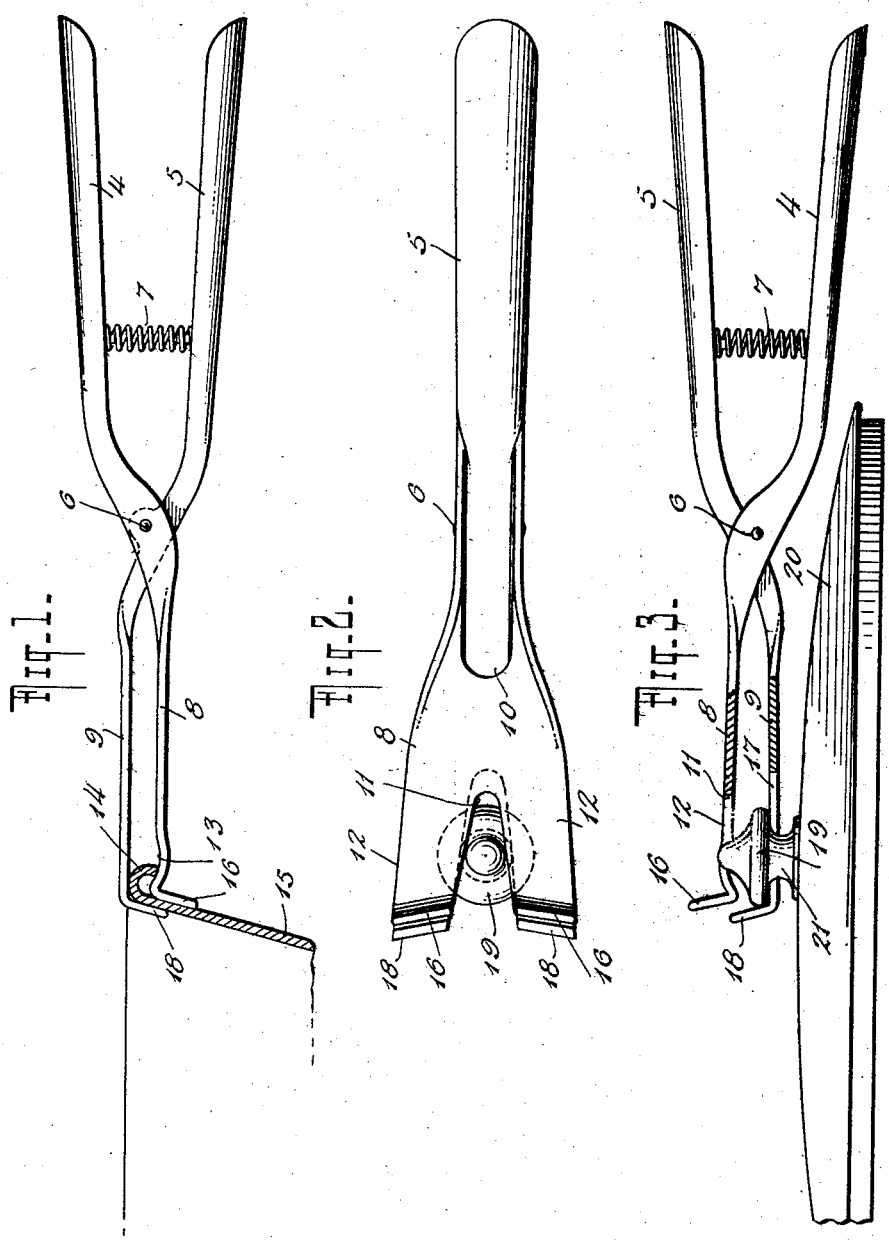
INVENTOR.
PETAR EIFRIED
BY Richards & Geier
ATTORNEYS.

Patented Mar. 30, 1926.

1,578,816

UNITED STATES PATENT OFFICE.

PETAR EIFRIED, OF PASSAIC, NEW JERSEY.

COMBINED POT AND LID LIFTER.

Application filed July 17, 1925. Serial No. 44,176.

*To all whom it may concern:*

Be it known that I, PETAR EIFRIED, a citizen of the United States, residing at Passaic, in the county of Passaic, and State of New Jersey, have invented certain new and useful Improvements in Combined Pot and Lid Lifters, of which the following is a specification.

This invention relates to improvements in combined pot and lid lifters, and has for one of its objects to provide a device of this character which is simple in construction and cheap to manufacture and which will effectively grip the edge of a pot or the knob of a lid so that either of said elements may be readily manipulated without burning the hand.

The above and other objects will appear more clearly from the following detailed description, when taken in connection with the accompanying drawing, which illustrates a preferred embodiment of the inventive idea.

In the drawing—

Figure 1 is a side elevation showing the implement in its operative position when applied to a pot or similar article;

Figure 2 is a top plan view of the implement when applied to the knob of a lid; and Figure 3 is a side elevation, partly in section, also showing the implement applied to the knob of a lid.

The lifter of the present invention is preferably made of aluminum stamped or cast to form the complemental handle members 4 and 5 pivoted together at 6 and normally held apart by a spring 7 introduced between the handles intermediate their ends.

Formed integrally with the handles 4 and 5 are the gripping jaws 8 and 9, respectively, the inner end of the jaw 9 adjacent the pivot 6 extending through an opening 10 formed in the inner end of the jaw 8. The jaws are of tapered formation and the jaw 8 is provided at its outer end with an inwardly tapered slot or bifurcation 11 to form the opposed arms 12, preferably having indentations 13 upon their inner surfaces and adjacent their outer extremities. These indentations provide grooves for receiving the edge 14 of a pot 15 or other receptacle when said jaw is engaged beneath said edge as shown in Figure 1. The extremities of the arms 12 are bent laterally to form the extensions 16 which engage the outer wall of the pot and act as a support therefor when the implement is used as in Figure 1.

The jaw 9 is also bifurcated to form the opposed arms 17 and the extremities of said arms are bent laterally to provide the extensions 18. The arms and extensions engage over the top edge of the pot 15 and against the inner wall thereof so that when the handles 4 and 5 are brought together against the tension of the spring 7, the arms 12 and 17 and the extremities 16 and 18 will securely grip the upper edge of the receptacle whereby the same may be easily moved from place to place. The extensions of the arms of each jaw are arranged so that their receptacle engaging faces will be disposed diagonally relative to each other and thereby cause said faces to conform substantially to the contour of the inner and outer walls of the receptacle.

When used as a lid lifter, the jaws are inverted and when in this position the implement is applied, with the handles spread, to the knob 19 of the lid 20, so that the shank 21 of said knob will enter the bifurcation in the jaw 9. In order to accommodate shanks of different thickness or diameter the bifurcation in the jaw 9 is made longer and wider, as clearly indicated in Figures 2 and 3. When the jaw 9 is properly positioned with the arms 17 arranged on opposite sides of the knob and the inner edges of said arms engaged with the shank 21, the handles 4 and 5 are brought together. The jaw 8 is thereby moved to a position wherein the bifurcation therein will receive the top of the knob and thus securely clamp said knob between the jaws and permit of the lid being lifted and carried to any desired place.

What is claimed is:

1. A combined pot and lid lifter including pivoted handles, jaws carried by said handles and each having a bifurcation to form a pair of arms, the extremities of the arms of said jaws having lateral extensions, and the extensions of one jaw cooperating with those of the other jaw to engage and retain the edge of a receptacle therebetween, and the extensions of each jaw having their receptacle-engaging faces diagonally disposed relative to each other so that said faces will conform substantially to the contour of the walls of said receptacle.

2. A combined pot and lid lifter including pivoted handles, and jaws carried thereby and each having tapered bifurcations therein capable of receiving, respectively, the shank and head of the knob of a lid.

3. A combined pot and lid lifter including pivoted handles, jaws carried by said handles and each having a bifurcation to form a pair of arms, the extremities of the arms of said jaws having lateral extensions and the extensions of one jaw cooperating with those of the other jaw to engage and retain the edge of a receptacle therebetween, the extensions of each jaw having their receptacle engaging faces diagonally disposed relative to each other so that said faces will conform substantially to the contour of the walls of said receptacle, and the arms of one jaw having grooves adjacent the extensions thereof for receiving a portion of the edge of said receptacle.

4. A combined pot and lid lifter including pivoted handles, jaws carried thereby and each having tapered bifurcations therein capable of receiving, respectively, the shank and head of the knob of a lid, the bifurcation receiving said shank being of greater length and width than the other bifurcation.

In testimony whereof I have affixed my signature.

PETAR EIFRIED.